Patented Mar. 4, 1952

2,587,805

UNITED STATES PATENT OFFICE 2,587,805

ARSENIC MODIFIED POLYSULFIDE PLASTICS

Lev Akobjanoff, Ann Arbor, Mich.

No Drawing. Application December 4, 1948,
Serial No. 63,620

4 Claims. (Cl. 260—79.1)

This invention relates to new compositions of matter resulting from the reaction of a difunctional organic compound and a chalcogen containing compound having a non-reactive non-sulfur containing nucleus to which the chalcogen atoms are attached either by a single or a double bond.

These new compositions of matter represent a new type of high molecular weight polymer which polymer may be referred to as a modified polysulfide plastic. The known polysulfide plastics containing the unit

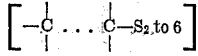

possess various disadvantages becoming, for instance, porous on heating, and yielding a disagreeable and toxic odor.

The modified polysulfide plastic of the present invention possesses the desirable properties of the polysulfide plastics together with other advantages and without the disadvantages just mentioned.

The modified polysulfide plastic contains the unit

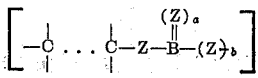

where

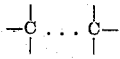

represents structure selected from the groups consisting of two carbon atoms connected by a valence bond and two carbon atoms separated by and joined to intervening structure, and where

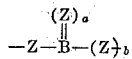

represents the residue of the chalcogen containing compound, in which Z is a chalcogen and B is a non-reactive non-sulfur containing nucleus. The values of $a$ and $b$ depend on the valence of B. The relationship between the values of $a$ and $b$ and the valence of B is shown as follows:

| Valence of B: | 2 | 3 | 4 | 5 | 6 |
|---|---|---|---|---|---|
| Value of $a$: | 0 | 0 | 1 | 1 | 2 |
| Value of $b$: | 1 | 2 | 1 | 2 | 1 |

The chalcogen containing compound which may be reacted with a difunctional organic compound may be exemplified by the following formulas:

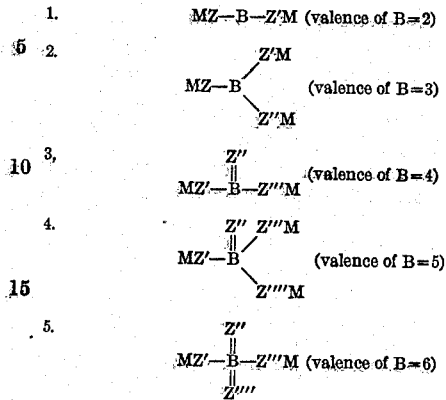

M is a member of the group consisting of alkali and alkaline earth metals, ammonia and amines, specific members include sodium, potassium, lithium, caesium, etc., barium, strontium, etc., ammonia, ethanolamines, etc. The preferred substituent is sodium.

The difunctional organic compound may be exemplified as follows:

in which X and X' are any substituent which can be split off by treatment with the alkaline substance M, specific members including halogen, acid sulphate, nitrate, acid phosphate, bicarbonate, formate, acetate, propionate, laurate, oleate, stearate, oxalate, acid malonate, acid tartrate, acid citrate, etc. The preferred substituent is chlorine. Thus an organic compound having at least two carbon atoms and a substituent attached to each of the carbon atoms, which substituent is split off during the reactions which occur when said compound is treated with a chalcogen containing compound, may be used in producing the plastics of this invention. The intervening structure between the two carbon atoms may be the following:

1. Saturated straight chain hydrocarbons
2. Saturated branched chain hydrocarbons
3. Aromatic structure
4. Unsaturated hydrocarbon structure
5. Ether linkage (including acetals, thioethers, etc.)

Members of the ether group include:

$$ClCH_2CH_2OCH_2CH_2Cl$$
$$CH_3CHClOCHClCH_3$$
$$ClCH_2OCH_2Cl$$
$$ClC_2H_4OC_2H_4OC_2H_4Cl$$
$$ClCH_2OCH_2C(CH_3)_2CH_2OCH_2Cl$$
$$ClCH_2CH_2CH_2OCH_2OCH_2CH_2CH_2Cl$$
$$ClCH_2CH_2OCH_2OCH_2CH_2Cl$$
$$ClCH_2CH_2OC_6H_4OCH_2CH_2Cl$$
$$ClCH_2OCH_2CH_2OCH_2Cl$$
$$ClC_6H_4OC_6H_4Cl$$
$$ClC_6H_4OCH_2Cl$$
$$ClC_6H_4CH_2OCH_2C_6H_4Cl$$

and other difunctional ethers.

Members of the unsaturated group include: 1,4-dichlorobutene 2;

$$ClCH_2CH:CHC_6H_4CH_2Cl$$
$$ClCH_2CH:CHCH_2CH_2Cl$$
$$ClCH_2CH:CH(CH_2)_3Cl$$

1,7 dichloro heptene 3; 1,6 dichlorohexene 3; 1,4 dichloro pentene 2; 1,6 dichloro heptene 3; and other difunctional unsaturated carbon compounds.

Members of the saturated straight chain group include: dichloro ethane, dichloro propane, dichloro butane and other compounds having the general formula $X(CH_2)_nX'$ where $n$ has a value greater than 2.

Members of the aromatic or aryl group include:

$$ClCH_2C_6H_4CH_2Cl$$

ortho dichlorobenzene; dichloro ortho xylene; p,p'dichloro diethyl benzene; $a,a'$ dichloro naphthalene; $\beta,\beta'$ dichloro naphthalene; 1,3 dichloro mesitylene and other difunctional aryl compounds.

Members of the saturated branched chain group include:

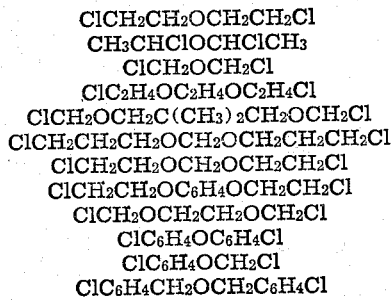

and other difunctional saturated branched chain compounds.

The reaction of dichloroethylene and sodium polysulfide has been known since 1840 when Loewig and Weidemann performed their experiments. Since then many polysulfide plastics have been synthetized as is shown by the patents to Joseph C. Patrick and many others but all of these plastics are polysulfides and possess the disadvantages shown above. None of these prior plastics were formulated in such a way that the sulfur group contained a non-reactive non-sulfur intervening structure. Thus sulfur groups such as:

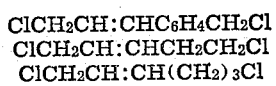

are known to exist in the repeating units of the polysulfide plastics of today and are the cause of the disagreeable odors possessed by these plastics. It has now been discovered that the presence of a non-reactive non-sulfur nucleus in these sulfur groups stabilizes the polysulfides against loss of volatile fragments containing sulfur, as shown by the odorless property of these new plastics. Also these new plastics do not have a tendency to blister or become porous when being processed as by molding.

The non-reactive nucleus is made from the elements of the group consisting of As, C, Hg, Mo, Sb, Se, Sn, Te, V, W, and Zn. The actual atomic grouping of B will depend upon the valence of the element being used and the conditions of reaction employed in producing the chalcogen containing compound. For example, when sodium sulfide is reacted with selenium a compound having the following structural formula is produced: Na—S—Se—Se—Se—Na which corresponds to the general formula MZ—B—Z'M (Numer 1 above) in which B is —Se—Se—, M is sodium, Z is sulfur and Z' is selenium.

In order to produce a chalcogen compound corresponding to the formula

(Number 2 above) sodium sulfide and arsenious sulfide ($As_2S_3$) are reacted together to produce the compound

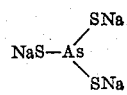

A compound corresponding to the formula

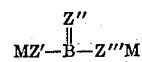

(Number 3 above) is prepared by reacting sodium sulfide with tin disulfide ($SnS_2$) to yield the substance

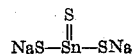

A compound corresponding to the formula

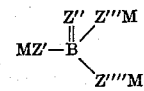

(Number 4 above) is prepared by reacting sodium sulfide with arsenious pentasulfide ($As_2S_5$) to give:

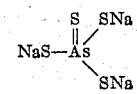

A compound corresponding to the formula

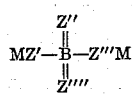

(Number 5 above) is prepared by reacting sodium sulfide with ammonium molybdate $$(NH_4)_6Mo_7O_{24}$$

to produce the compound

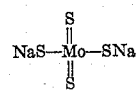

Thus it may be seen that in the production of the plastics of this invention the chalcogen atoms are chemically bound together by the non-reactive nucleus B. Compounds have been produced in which B has the value

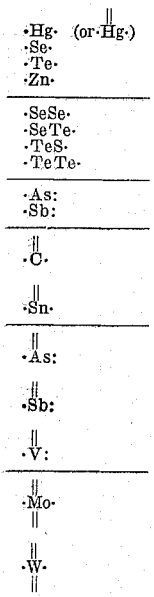

Some of the salts of the metals containing the value of B above are prepared as follows:

1. As₂S₃+3Na₂S→2As(SNa)₃
2. As₂S₅+3Na₂S→2As(S)(SNa)₃
3. CS₂+Na₂S→C(S)(SNa)₂
4. HgS+Na₂S→Hg(SNa)₂ or HgS+2Na₂S→Hg(S)(Na₂S)₂
5. MoS₃+Na₂S→Mo(S)₂(SNa)₂
6. 3Se+Na₂S→Na₂SSe₃
7. Sb₂S₅+3Na₂S→2Sb(S)(SNa)₃
8. SnS₂+Na₂S→Sn(S)(SNa)₂
9. 2Te+Na₂S→Na₂Te₂S
10. V₂S₅+3Na₂S→2V(S)(SNa)₃
11. WS₃+Na₂S→W(S)₂(SNa)₂
12. ZnS+Na₂S→Zn(SNa)₂

Another important characteristic of these salts is their ability to readily react with the difunctional organic compound. The reaction of these salts with the organic compounds is carried out in a solvent medium where the compounds are mutually solvent. For work in aqueous medium, the organic substance may be emulsified or in a molten state. For example, the solutions may correspond to the use of a ⅕ gram-molecular weight of the salt dissolved in 180 parts of water corresponding to 10 grams molecular weight. The organic compound such as dichloroethylene may be added in a slight molecular excess and the mixture may be heated progressively.

The sulfocarbonates, mercuriates, molybdates vanadates, tungstates and zincates react with the organic compound

readily at room temperature, and more quickly (30 minutes to 1 hour) when the mixture is boiled. A thick precipitate forms as the reaction takes place. The sulfoantimonates react energetically, for example, with dichloroethylene. The polymers formed are a yellowish white. The reaction of the sulfoarsenites, arsenates, and stannates is complete after heating for 15 hours at 120° C. if reacted under pressure. The products of reaction can be filtered, washed with water and dried in air.

Compounds of the type

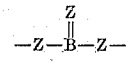

and —Z—B—Z— such as

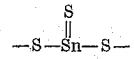

—S—Se—Se—Se—, and —S—Zn—S— are thermoplastic, softening at temperatures of 150° C. to 180° C.; for the type

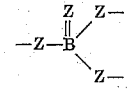

e. g. when B is As, only slight softening is observed on heating as high as 240°–250° C. The same is true for the type

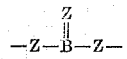

when B is Hg. The softening point of known polysulfide plastics is 75° C.

The solubility of these products in organic solvents depends on the organic material used for their preparation. Among the derivatives of ethylene only the thiocarbonate swells when immersed in benzene.

The following examples illustrate the manner of making the

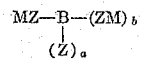

compounds and the conditions under which these compounds are reacted with the difunctional organic compound

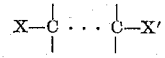

to produce the plastics of this invention. All parts are by weight unless otherwise indicated.

*Example 1*

A compound containing the nucleus —SeSe— was prepared by melting a mixture of 7.8 parts of sodium sulfide (Na₂S) and 25 parts of selenium (Se). A heavy red brown mass was formed which was found to be sodium sulfoselenide (Na₂SSe₃).

A modified plastic having the general formula (—SSeSeSeR—)$_y$ was prepared by reacting 16 parts of filtered sodium sulfoselenide with 6 parts of ethylene dichloride (ClCH₂CH₂Cl) and 45 parts of water at a temperature of 40 to 50° C. for 20 minutes. The resulting resin was tough, but sufficiently plastic to work on a rubber mill, reddish in color, substantially odorless, thermoplastic, soluble in carbon disulfide, insoluble in benzene, and softened when heated at 70° C. The color of the resin may be reduced to a light yellow by dissolving the resin in carbon disulfide and evaporating the mixture.

*Example 2*

A compound containing the nucleus —TeTe— was prepared by melting a mixture of 7.8 parts of sodium sulfide and 40 parts of telurium. A heavy red brown mass was formed which was found to be sodium sulfotelluride (Na₂STe₃).

A modified plastic having the general formula (—STeTeTeR—)$_y$ was prepared by reacting 24 parts of filtered sodium sulfotelluride with 6 parts of ethylene dichloride and 45 parts of water at a temperature of 40 to 50° C. for 20 minutes. The resulting resin was hard and brittle, black in color, substantially odorless, thermoplastic, soluble in carbon disulfide, insoluble in benzene. The color of the resin may be reduced to a light yellow by dissolving the resin in carbon disulfide and evaporating the mixture.

Example 3

A compound containing the nucleus —Hg— was prepared by reacting 15 parts of mercuric sulfide (HgS) with 7.8 parts of sodium disulfide in 35 parts by volume of water. A colorless solution containing the compound sodium sulfomercuriate $(NaS)_2Hg$ was formed.

A modified plastic having the general formula $(-SHgSR-)_y$ was prepared by reacting 19.5 parts of sodium sulfomercuriate with 10 parts of ethylene dichloride and 30 parts of water at a temperature of 20° C. for ½ hour and then at a temperature of 84° C. for 1 hour. The resulting resin was a white powder, substantially odorless, sublimated at temperatures above 240° C., soluble in acetone, benzene, and carbon disulfide, and insoluble in naphtha.

Example 4

A compound containing the nucleus —Zn— was prepared by reacting 12 parts of zinc sulfide ZnS with 7.8 parts of sodium sulfide in 50 parts of water. A viscous colorless solution was formed containing the compound sodium sulfozincate $(NaS)_2Zn$.

A modified plastic having the general formula $(-SZnSR-)_y$ was prepared by reacting 17.5 parts of $(NaS)_2Zn$ with 10 parts of ethylene dichloride and 45 parts of water at 20° C. for ½ hour and then 84° C. for 1 hour. The resulting resin was white, odorless, melted at 184° C., soluble in acetone, benzene, and naphtha and insoluble in carbon disulfide.

A further reaction was carried out in which 15 parts of $O(C_2H_4Cl)_2$ was reacted with 17.5 parts of $(NAS)_2Zn$ and 45 parts of water at 84° C. for 6 hours. The resulting material was a yellowish oil of medium viscosity, odorless at room temperature and having a very weak aromatic odor when warmed, soluble in benzene, acetone, diethyl ether and insoluble in carbon disulfide and naphtha.

Example 5

A compound containing the nucleus —Zn— was prepared by reacting 20 parts of ZnS with 14 parts of KOH dissolved in 30 parts of water, the resulting filtered solution contained a compound having the formula potassium sulfoxyzincate $Zn(SK)(OK)$.

A compound having a general formula HOZnSR was prepared by reacting 19 parts of KOZnSK with 10 parts of ethylene dichloride and 30 parts of water at 84° C. for 8 hours. The resulting material was a white dry powder which carbonized at a temperature above 240° C.; very slightly soluble in carbon disulfide, naphtha, and acetone, and insoluble in benzene.

Example 6

A compound containing the nucleus —C(S)— was prepared by reacting 7.8 parts of $Na_2S$ in 50 parts by volume of water with 8 parts of $CS_2$. The reaction was carried out by shaking the mixture and allowing to stand at room temperature until an intense red color appeared. A red oil was extracted with ether. Evaporation of traces of carbon disulfide produces crystalline sodium thiocarbonate $Na_2CS_3$.

A modified plastic having a general formula $[-SC(S)SR]_y$ was prepared by reacting 15.4 parts of $Na_2CS_3$ with 10 parts of ethylene dichloride and 45 parts of water at 20° C. for ½ hour and then at 84° C. for 20 minutes. The resulting product was a pasty mass having a very bright yellow color, strong sour odor; melting at 64° C. and on further heating hardening to a glossy yellow mass; soluble in carbon disulfide, benzene, naphtha and acetone.

Example 7

A compound containing the nucleus —Sn(S)— was prepared by melting a mixture of 7.8 parts of $Na_2S$ and 18 parts of $SnS_2$ prepared by reacting a stannic salt in aqueous solution with $H_2S$ and extracting the resulting mixture with acetone to eliminate the free sulfur. A resulting compound was sodium sulfostannate $Na_2SnS_3$.

A modified plastic having the general formula $[-SSn(S)SR-]_y$ was prepared by reacting 52.2 parts of $Na_2SnS_3$ with 20 parts of ethylene dichloride and 180 parts of water at 120° C. for 15 hours. The resulting resin was elastic and workable on a rubber mill, thermoplastic at approximately 170° C., soluble in carbon disulfide and insoluble in benzene.

Example 8

A compound containing the nucleus —As< was prepared by melting a mixture comprising 7.8 parts of $Na_2S$ with 25 parts of $As_2S_3$ prepared by reacting sodium arsenite with $H_2S$ in acid solution, and extracting the resulting mixture with acetone to eliminate free sulfur. The resulting compound was sodium sulfoarsenite having the formula $(NaS)_3As$.

A modified plastic having the general formula

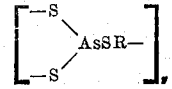

was prepared by reacting 48 parts of $(NaS)_3As$ with 30 parts of ethylene dichloride and 180 parts of water at 120° C. for 15 hours. The resulting product was granular and white in color, workable into a plastic sheet on a rubber mill; possessed no odor even when heated at a temperature of 150° C. and above, slightly thermoplastic at 185° C. to 195° C., infusible even at 250° C.; soluble in carbon disulfide and insoluble in benzene.

A further reaction was carried out in which 72 parts of $CH_3CH(OC_2H_4Cl)_2$ was reacted with 48 parts of $(NaS)_3As$ in the presence of 180 parts of water at 100° C. for 16 hours. The resulting product was a translucent greenish, tacky, very elastic mass, having no odor, soluble in carbon disulfide, benzene and acetone, and insoluble in naphtha.

A still further reaction was carried out in which 70 parts of $C_2H_5Br$ was reacted with 48 parts of $(NaS)_3As$ in the presence of 180 parts of water at 35 to 40° C. for 20 minutes. The resulting product was a yellowish waxy substance soluble in water, alcohol, and insoluble in ether, acetone and chloroform; decomposes at 120 to 130° C.

Example 9

A mixture of compounds containing the nuclei

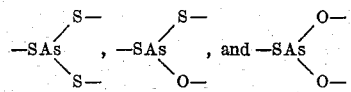

was prepared by reacting 14 parts of arsenic trioxide $As_2O_3$ with 15.8 parts of $Na_2S$ in 180 parts of water. The resulting product contained sodium sulfoarsenite NaSAs(SNa)₂; sodium disulfomonooxyarsenite

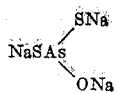

and sodium monosulfodioxyarsenite

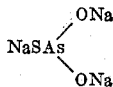

A modified plastic containing compounds having the general formula

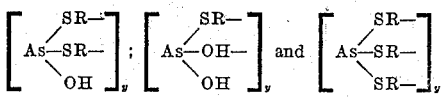

was produced by reacting 63.2 parts of the above mixture of sulfo- and sulfooxyarsenites with 60 parts of ethylene dichloride in emulsion in 494 parts of water, 6 parts of a 20% solution of ammonia, 6 parts of sodium sulforicinate and 3 parts of caseine for 12 hours at 115° C. A granular condensate was obtained.

*Example 10*

A compound containing the nucleus —As(S)< was prepared by melting a mixture of 7.8 parts of Na₂S with 32 parts of As₂S₅ obtained by reacting Na₃AsO₄ in acid water solution with H₂S at a low temperature. The resulting compound was sodium sulfoarsenate Na₃AsS₄.

A modified plastic having the general formula

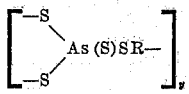

was prepared by reacting 54.4 parts of Na₃AsS₄ with 30 parts of ethylene dichloride in the presence of 180 parts of water at 120° C. for 15 hours. The resulting product was an elastic composition workable on a rubber mill, substantially odorless, thermoplastic at 100° C., soluble in carbon disulfide, and insoluble in benzene.

*Example 11*

A compound containing the nucleus —Sb(S)< was prepared by reacting 7.8 parts of Na₂S with 41 parts of Sb₂S₅. The resulting compound was sodium sulfoantimonate Na₃SbS₄.

A modified plastic having the general formula

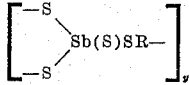

was prepared by reacting 64 parts of Na₃SbS₄ with 30 parts of ethylene dichloride in the presence of 180 parts of water at 84° C. The reaction was completed very rapidly. The resulting product was yellow at first and turning brown in color; workable on a rubber mill, thermoplastic at 100° C., soluble in carbon disulfide, and insoluble in benzene.

*Example 12*

A compound containing the nucleus —V(S)< was prepared by reacting 7.8 parts of Na₂S in 25 parts of water with 12 parts of NH₄VO₃ in 450 parts of water. The resulting product was sodium sulfovanadate Na₃VS₄.

A modified plastic having the general formula

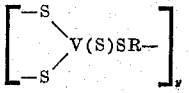

was prepared by reacting 49 parts of Na₃VS₄ with 30 parts of ethylene dichloride in 900 parts of water at 84° C. for 15 min. The resulting product was white, slightly sticky, substantially odorless melting at 141° C., and soluble in benzene, naphtha, carbon disulfide and acetone.

*Example 13*

A compound containing the nucleus —Mo(S)₂— was prepared by reacting 31.2 parts of Na₂S in 50 parts of water with 15 parts of (NH₄)₆Mo₇O₂₄ in 100 parts of water. The resulting product was sodium sulfomolybdate Na₂MoS₄.

A modified plastic having the general formula [—SMo(S)₂SR—]ᵧ was prepared by reacting 45 parts of Na₂MoS₄ and 20 parts of ethylene dichloride and 300 parts of water at 84° C. for 30 minutes. The resulting product was white, odorless, melting at 178° C., soluble in carbon disulfide, naphtha, and benzene and insoluble in acetone.

*Example 14*

A compound containing the nucleus —W(S)₂— was prepared by reacting 31.2 parts of Na₂S in 20 parts of water with 30 parts of Na₂WO₄ in 100 parts of water. The resulting product was sodium sulfotungstate Na₂WS₄.

A modified plastic having the general formula [—SW(S)₂SR—]ᵧ was prepared by reacting 62.5 parts of Na₂WS₄ with 20 parts of ethylene dichloride in the presence of 240 parts of water at 84° C. for 30 minutes. The resulting product was white, odorless, melting at 130° C., soluble in benzene, carbon disulfide and acetone, and insoluble in naphtha.

A further reaction was carried out in which 30 parts of O(C₂H₄Cl)₂ was reacted with 62.5 parts of Na₂WS₄ in the presence of 240 parts of water at 84° for 2 hours. The resulting oily product was colorless, odorless, and soluble in benzene, acetone and carbon disulfide.

The above reactions may also be carried out using monohalides in place of the dihalides. For example, when Na₃AsS₃ dissolved in water is reacted with ethyl bromide and reacted at 35–40° C. and the resulting mixture extracted with alcohol a yellowish, waxy and odorless material soluble in water and alcohol and insoluble in ether, acetone and chloroform is obtained.

The modified polysulfides obtained by the various processes described are processed in a manner similar to that used in the treatment of ordinary polysulfides. In particular they may be worked by the proceedings established for rubber and other plastics. The compounding of the modified polysulfides may follow the same lines as compounding of ordinary polysulfides. Very interesting is the treatment with sulfur.

Sulfur sublimes even more readily than the ordinary polysulfides but as far as odor is concerned, the effect of sulfur vapors is practically non-existent, contrary to known polysulfides especially those having the formula —C₂H₄S₄—, which produce a violent physiological reaction. It has been found in the course of this work that mixtures of polysulfides with sulfur are plasticized by simple heating to temperatures ranging from 80° C. to 150° C. Modified polysulfides show this effect to the same degree as the others. Products so prepared are similar to "vulcanized" polysulfides by all their essential characteristics. In principle there is no limit to the quantities of sulfur that may be added but sulfur in amounts of 300% and more requires the addition of stabilizing substances in order to avoid aging.

Another interesting effect is obtained by blending modified polysulfides with ordinary polysulfides. The resulting blend is less volatile than the ordinary polysulfide.

For example, separately prepared elastomers may be blended by mixing 100 parts of ethylene tetrasulfide with 0.5 part of stearic acid and 10 parts of zinc oxide on a rubber roll in the usual way and after a smooth sheet is formed adding 10 parts of polyethylene sulfotelluride —CHH·CHH·S·Te·Te—

The resulting mixture is vulcanized by heating, for instance, for 45 minutes at 145° C. in a hot mold. No pores are formed in the molded blend when removed from the mold.

While certain representative embodiments and details have been shown for the purpose of illustrating the invention, it will be apparent to those skilled in this art that various changes and modifications may be made therein without departing from the spirit or scope of the invention.

I claim:

1. A polymeric substance having the repeating unit

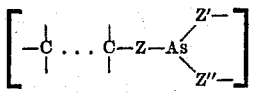

in which

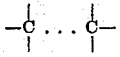

represents structure selected from the group consisting of two adjacent carbon atoms connected by a valence bond and two carbon atoms separated by and joined to intervening structure, Z, Z' and Z'' are chalcogens.

2. A polymeric substance having the repeating unit

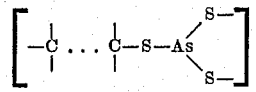

in which

represents structure selected from the group consisting of two adjacent carbon atoms connected by a valence bond and two carbon atoms separated by and joined to intervening structure.

3. A polymeric substance having the repeating unit

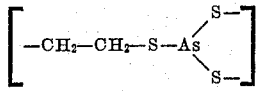

4. A polymeric substance having the repeating unit

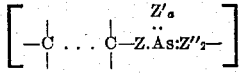

in which

represents structure selected from the group consisting of two adjacent carbon atoms connnected by a valence bond and two carbon atoms separated by and joined to intervening structure; Z, Z' and Z'' are chalcogens; As is the element arsenic in its tri- and pentavalent forms; and wherein $a$ is zero when the valence of As is 3, and $a$ is one when the valance of As is 5.

LEV AKOBJANOFF.

REFERENCES CITED

The following references are of record in the file of this patent:

UNITED STATES PATENTS

| Number | Name | Date |
|---|---|---|
| 2,012,347 | Patrick | Aug. 27, 1935 |
| 2,026,875 | Ellis | Jan. 7, 1936 |
| 2,097,155 | Groll | Oct. 26, 1937 |
| 2,341,453 | Lieber | Feb. 8, 1944 |

FOREIGN PATENTS

| Number | Country | Date |
|---|---|---|
| 60,948 | Denmark | May 24, 1943 |
| 792,083 | France | Oct. 14, 1935 |

OTHER REFERENCES

Macallum, Jour. Organic Chem., Jan. 1948, pages 154–159.